United States Patent
Wei et al.

(10) Patent No.: US 11,855,291 B1
(45) Date of Patent: Dec. 26, 2023

(54) SURFACE TREATMENT COMPOSITION, ELECTRODE AND PREPARATION METHOD THEREOF, SECONDARY BATTERY, AND DEVICE

(71) Applicant: CONTEMPORARY AMPEREX TECHNOLOGY CO., LIMITED, Ningde (CN)

(72) Inventors: Zhiting Wei, Ningde (CN); Ning Wang, Ningde (CN); Xinghui Wang, Ningde (CN); Shisong Li, Ningde (CN); Shengwu Zhang, Ningde (CN); Sainan Mu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/337,135

(22) Filed: Jun. 19, 2023

Related U.S. Application Data

(63) Continuation of application No. PCT/CN2022/074634, filed on Jan. 28, 2022.

(51) Int. Cl.
*H01M 4/66* (2006.01)
*H01M 4/02* (2006.01)

(52) U.S. Cl.
CPC .......... *H01M 4/667* (2013.01); *H01M 4/662* (2013.01); *H01M 2004/027* (2013.01)

(58) Field of Classification Search
None
See application file for complete search history.

(56) References Cited

FOREIGN PATENT DOCUMENTS

| CN | 102593464 A | 7/2012 |
|---|---|---|
| CN | 104115316 A | 10/2014 |
| CN | 106876716 A | 6/2017 |
| CN | 107541760 A | 1/2018 |
| CN | 110003627 A | 7/2019 |
| JP | H1112343 A | 1/1999 |

OTHER PUBLICATIONS

Zhang, J., Xiao, Y., Xu. H., Zhou, C., Lang, M.—Synthesis of well-defined carboxyl poly(e-caprolactone) by fine-tuning the protection group, Polym. Chem., 2016, 7, 4630 (Year: 2016).*
Chen, T., Cai, T., Jin, Q., Ji, J.—Design and fabrication of functional caprolactone, e-Polymers 2015; 15(1), pp. 3-13 (Year: 2015).*
Bromberg, L., Temchenko, M., Alakhov, V., Hatton, T.A.—Bioadhesive properties and rheology of polyether-modified poly(acrylic acid) hydrogels, International Journal of Pharmaceutics 282 (2004), pp. 45-60 (Year: 2004).*
The World Intellectual Property Organization (WIPO) International Search Report and Written Opinion for PCT/CN2022/074634 dated Oct. 13, 2022 12 pages (including English translation).

* cited by examiner

*Primary Examiner* — Anca Eoff
(74) *Attorney, Agent, or Firm* — ANOVA LAW GROUP, PLLC

(57) ABSTRACT

A surface treatment composition includes, expressed as parts by weight, a first ingredient of 1 to 30 parts and a second ingredient of 1 to 30 parts. The first ingredient is a polycaprolactone modified with an acidic group and/or a salt of the acidic group. The second ingredient is selected from polyether-modified polyolefin acid, polyether-modified polyalkenoate salt, polyether-modified polyalkenoate ester, or a combination thereof.

18 Claims, 3 Drawing Sheets

SURFACE TREATMENT COMPOSITION, ELECTRODE AND PREPARATION METHOD THEREOF, SECONDARY BATTERY, AND DEVICE

CROSS-REFERENCE TO RELATED APPLICATION

This application is a continuation of International Application No. PCT/CN2022/074634, filed on Jan. 28, 2022, the entire content of which is incorporated herein by reference.

TECHNICAL FIELD

This application relates to the technical field of batteries, and in particular, to a surface treatment composition, an electrode and a preparation method thereof, a secondary battery, and a device.

BACKGROUND

In recent years, secondary batteries have been applied wider in many fields, including energy storage power systems such as hydro, thermal, wind, and solar power stations, and other fields such as electric tools, electric bicycles, electric motorcycles, and electric vehicles, military equipment, and aerospace. The great development of the secondary batteries gives rise to higher requirements on the energy density, cycle performance, safety performance, and other performance of the batteries.

In the related art, a surface of a current collector foil is modified before being coated with an active material. However, in the related art, only a single-ingredient surface treatment agent is applied, thereby making very limited improvements to surface properties of the current collector. Therefore, better techniques for surface treatment of a current collector still need to be put forward in this field.

SUMMARY

This application is made in view of the above problem. An objective of this application is to provide a novel surface treatment composition. The surface treatment composition is applicable to treatment of a surface of a current collector. After being treated, the current collector and an active material are improved in terms of one or more performance indicators.

To achieve the foregoing objective, a first aspect of this application provides a surface treatment composition, expressed as parts by weight, including:
- a first ingredient 1 to 30 parts; and
- a second ingredient 1 to 30 parts, where
- the first ingredient is a polycaprolactone modified with an acidic group and/or with a salt of the acidic group; and
- the second ingredient is selected from polyether-modified polyolefin acid, polyether-modified polyalkenoate salt, polyether-modified polyalkenoate ester, or a combination thereof.

Without being limited by theory, the surface treatment composition according to this application can form an intermediate layer after being applied to a surface of a current collector foil. The intermediate layer can effectively enhance performance of bonding between the current collector foil and an active material layer, thereby increasing bonding strength and conductivity of an electrode plate.

In some embodiments, the acidic group and/or a salt of the acidic group is selected from an acidic group, an acidic salt group, or a combination thereof. The acidic group is selected from a hydroxyl group, a carboxylic acid group, a sulfonic acid group, or phosphoric acid group. The acidic salt group is selected from a hydroxylate group, a carboxylate group, a sulfonate group, a phosphonate group, or a combination thereof. In this way, the surface treatment composition can improve the bonding force between the current collector foil and the active material layer and enhance the bonding performance more effectively.

In some embodiments, in the first ingredient, a weight percent of the acidic group and/or a salt of the acidic group is 10 wt % to 40 wt %. In this way, the surface treatment composition can improve the bonding force between the current collector foil and the active material layer and enhance the bonding performance more effectively.

In some embodiments, in the second ingredient, a weight percent of a polyether group is 20 wt % to 50 wt %. In this way, the surface treatment composition can improve the bonding force between the current collector foil and the active material layer and enhance the bonding performance more effectively.

In some embodiments, a number-average molecular weight of the first ingredient is 50,000 to 150,000. In this way, the surface treatment composition can improve the bonding force between the current collector foil and the active material layer and enhance the bonding performance more effectively.

In some embodiments, a number-average molecular weight of the second ingredient is 6,000,000 to 10,000,000. In this way, the surface treatment composition can improve the bonding force between the current collector foil and the active material layer and enhance the bonding performance more effectively.

In some embodiments, a solubility of the first ingredient in water at 25° C. is at least 40 g/100 ml. In this way, the surface treatment composition can improve the bonding force between the current collector foil and the active material layer and enhance the bonding performance more effectively.

In some embodiments, a solubility of the second ingredient in water at 25° C. is at least 40 g/100 ml. In this way, the surface treatment composition can improve the bonding force between the current collector foil and the active material layer and enhance the bonding performance more effectively.

In some embodiments, the first ingredient includes a substance represented by the following general formula:

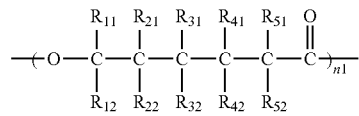

In the formula above, one or more of $R_{11}$, $R_{12}$, $R_{21}$, $R_{22}$, $R_{31}$, $R_{32}$, $R_{41}$, $R_{42}$, $R_{51}$, or $R_{52}$ are the acidic group and/or a salt of the acidic group, and remaining groups are selected from hydrogen, $C_1$ to $C_6$ alkyl, $C_1$ to $C_6$ haloalkyl, and halogen; and $n_1$ is an integer greater than or equal to 1. In this way, the surface treatment composition can improve the bonding force between the current collector foil and the active material layer and enhance the bonding performance more effectively.

In some embodiments, one or more of $R_{11}$, $R_{12}$, $R_{21}$, $R_{22}$, $R_{31}$, $R_{32}$, $R_{41}$, $R_{42}$, $R_{51}$, or $R_{52}$ are selected from a carboxylic acid group, a sulfonic acid group, a phosphoric acid group, a carboxylate group, a sulfonate group, or a phosphonate group. In this way, the surface treatment composition can improve the bonding force between the current collector foil and the active material layer and enhance the bonding performance more effectively.

In some embodiments, at least one of $R_{11}$, $R_{12}$, $R_{21}$, $R_{22}$, $R_{31}$, $R_{32}$, $R_{41}$, $R_{42}$, $R_{51}$, or $R_{52}$ is —OH, and at least one thereof is —COOH. In this way, the surface treatment composition can improve the bonding force between the current collector foil and the active material layer and enhance the bonding performance more effectively.

In some embodiments, one of $R_{11}$, $R_{12}$, $R_{21}$, $R_{22}$, $R_{31}$, $R_{32}$, $R_{41}$, $R_{42}$, $R_{51}$, or $R_{52}$ is —OH, and one thereof is —COOH. In this way, the surface treatment composition can improve the bonding force between the current collector foil and the active material layer and enhance the bonding performance more effectively.

In some embodiments, one of $R_{11}$, $R_{12}$, $R_{21}$, $R_{22}$, $R_{31}$, $R_{32}$, $R_{41}$, $R_{42}$, $R_{51}$, or $R_{52}$ is —OH, one thereof is —COOH, and the —OH and the —COOH are linked to different carbon atoms.

In this way, the surface treatment composition can improve the bonding force between the current collector foil and the active material layer and enhance the bonding performance more effectively.

In some embodiments, one of $R_{41}$ or $R_{42}$ is —OH, and one of $R_{21}$ or $R_{22}$ is —COOH. In this way, the surface treatment composition can improve the bonding force between the current collector foil and the active material layer and enhance the bonding performance more effectively.

In some embodiments, the second ingredient includes a substance represented by

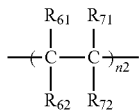

the following general formula:

In the formula above, one or more of $R_{61}$ and $R_{62}$ are polyether groups; and $R_{71}$ is selected from a hydrogen atom, $C_1$ to $C_{10}$ alkyl, $C_1$ to $C_{10}$ haloalkyl, and halogen; $R_{72}$ is selected from carboxyl, a carboxylate group (such as a lithium carboxylate group or a sodium carboxylate group), $C_1$ to $C_3$ alkyl carboxyl, a $C_1$ to $C_3$ alkyl carboxylate group, an ester group, and a $C_1$ to $C_3$ alkyl ester group; and $n_2$ is an integer greater than or equal to 1. In this way, the surface treatment composition can improve the bonding force between the current collector foil and the active material layer and enhance the bonding performance more effectively.

In some embodiments, the polyether group is selected from a polyethylene glycol diglycidyl ether group, a polyether polyol group, and a combination thereof. In this way, the surface treatment composition can improve the bonding force between the current collector foil and the active material layer and enhance the bonding performance more effectively.

In some embodiments, the ester group is selected from a methyl ester group, a propyl ester group, or a butyl ester group.

In some embodiments, $R_{61}$ is a hydrogen atom, and $R_{62}$ is a polyether polyol group. In this way, the surface treatment composition can improve the bonding force between the current collector foil and the active material layer and enhance the bonding performance more effectively.

In some embodiments, $R_{71}$ is a hydrogen atom, and $R_{72}$ is selected from a hydrogen atom, $C_1$ to $C_{10}$ alkyl, $C_1$ to $C_{10}$ haloalkyl, and halogen. In this way, the surface treatment composition can improve the bonding force between the current collector foil and the active material layer and enhance the bonding performance more effectively.

According to a second aspect, this application provides an electrode, including:
 a current collector;
 an active material layer, where the active material layer covers at least a part of a surface of the current collector; and
 an intermediate layer, where the intermediate layer is located between the current collector and the active material layer.

The intermediate layer contains the surface treatment composition according to any aspect described above.

In some embodiments, the electrode is a negative electrode. In this way, the surface treatment composition can improve the bonding force between the current collector foil and the active material layer and enhance the bonding performance more effectively.

In some embodiments, a material of the current collector includes copper or a copper alloy. In this way, the surface treatment composition can improve the bonding force between the current collector foil and the active material layer and enhance the bonding performance more effectively.

According to a third aspect, this application provides a secondary battery, including the electrode according to any aspect described above. In this way, the surface treatment composition can improve the bonding force between the current collector foil and the active material layer and enhance the bonding performance more effectively.

According to a fourth aspect, this application provides a device, including the secondary battery according to any aspect described above. The secondary battery is configured to provide electrical energy to the device. In this way, the surface treatment composition can improve the bonding force between the current collector foil and the active material layer and enhance the bonding performance more effectively.

Beneficial Effects

One or more embodiments of this application have achieved one or more of the following benefits:
 (1) Surface energy of the current collector treated with the surface treatment composition is enhanced;
 (2) Tensile performance of the electrode prepared from the current collector treated with the surface treatment composition is enhanced;
 (3) Bonding strength between the active material layer and the current collector is enhanced after the current collector is treated with the surface treatment composition; and
 (4) After the current collector is treated with the surface treatment composition, the bonding force between a binder ingredient (styrene-butadiene rubber) in the active material layer and the surface-treated electrode plate is enhanced. Therefore, during drying of the active material layer, the binder ingredient is not prone to segregate away from the current collector with the evaporation of moisture caused by the drying.

REFERENCE NUMERALS

Figure 1:
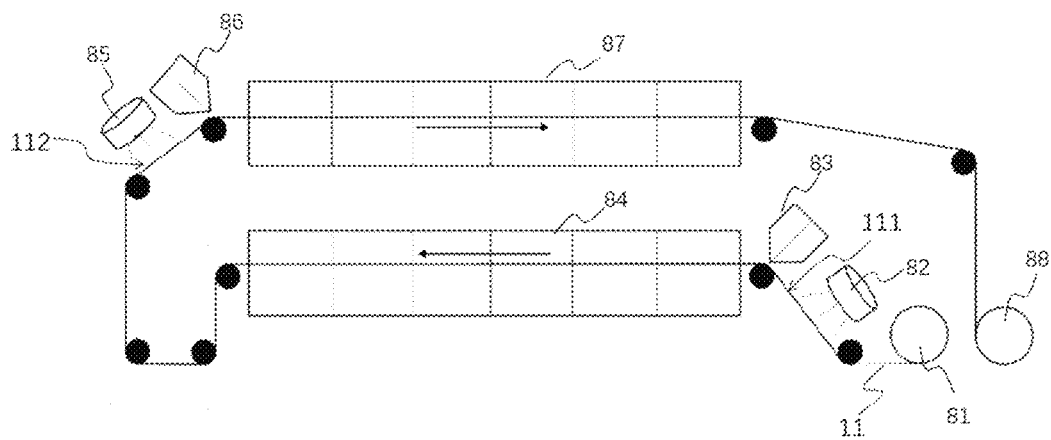
FIG. 1 is a schematic flowchart of preparing an electrode according to an embodiment.
Figure 2:
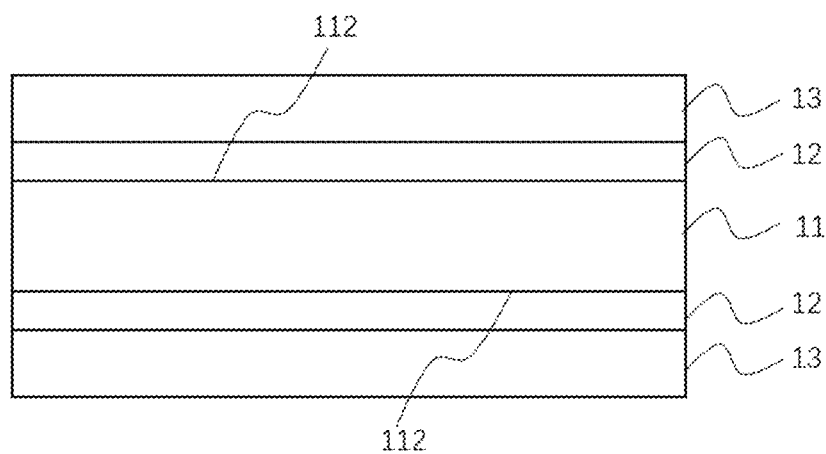
FIG. 2 is a schematic structural diagram of an electrode according to an embodiment.

Battery pack 1; upper box 2; lower box 3; battery module 4; secondary battery 5; housing 51; electrode assembly 52; top cap assembly 53; current collector 11; first side 111; second side 112; unwinder 81; first sprayer 82; first active material slurry applicator 83; first dryer 84; second sprayer 85; second active material slurry applicator 86; second dryer 87; rewinder 88.

DETAILED DESCRIPTION OF EMBODIMENTS

The following describes and discloses in detail a negative active material and a preparation method thereof, a positive electrode plate, a negative electrode plate, a secondary battery, a battery module, a battery pack, and an electrical device according to this application with due reference to drawings. However, unnecessary details may be omitted in some cases. For example, a detailed description of a well-known matter or repeated description of an essentially identical structure may be omitted. That is intended to prevent the following descriptions from becoming unnecessarily lengthy, and to facilitate understanding by a person skilled in the art. In addition, the drawings and the following descriptions are intended for a person skilled in the art to thoroughly understand this application, but not intended to limit the subject-matter set forth in the claims.

A "range" disclosed herein is defined in the form of a lower limit and an upper limit. A given range is defined by a lower limit and an upper limit selected. The selected lower and upper limits define the boundaries of a particular range. A range so defined may be inclusive or exclusive of the end values, and a lower limit of one range may be arbitrarily combined with an upper limit of another range to form a range. For example, if a given parameter falls within a range of 60 to 120 and a range of 80 to 110, it is expectable that the parameter may fall within a range of 60 to 110 and a range of 80 to 120 as well. In addition, if lower-limit values 1 and 2 are listed, and if upper-limit values 3, 4, and 5 are listed, the following ranges are all expectable: 1 to 3, 1 to 4, 1 to 5, 2 to 3, 2 to 4, and 2 to 5. Unless otherwise specified herein, a numerical range "a to b" is a brief representation of a combination of any real numbers between a and b inclusive, where both a and b are real numbers. For example, a numerical range "0 to 5" herein means all real numbers recited between 0 and 5 inclusive, and the expression "0 to 5" is just a brief representation of a combination of such numbers. In addition, a statement that a parameter is an integer greater than or equal to 2 is equivalent to a disclosure that the parameter is an integer such as 2, 3, 4, 5, 6, 7, 8, 9, 10, 11, 12, and so on.

Unless otherwise expressly specified herein, any embodiments and optional embodiments hereof may be combined with each other to form a new technical solution.

Unless otherwise expressly specified herein, any technical features and optional technical features hereof may be combined with each other to form a new technical solution.

Unless otherwise expressly specified herein, all steps described herein may be performed in sequence or at random, and in some embodiments in sequence. For example, that the method includes steps (a) and (b) indicates that the method may include steps (a) and (b) performed in sequence, or steps (b) and (a) performed in sequence. For example, that the method may further include step (c) indicates that step (c) may be added into the method in any order. For example, the method may include steps (a), (b), and (c), or may include steps (a), (c), and (b), or may include steps (c), (a), and (b), and so on.

Unless otherwise expressly specified herein, "include" and "comprise" mentioned herein mean open-ended inclusion. For example, the terms "include" and "comprise" may mean inclusion of other items that are not recited.

Unless otherwise expressly specified herein, the term "or" is inclusive. For example, the expression "A or B" means "A alone, B alone, or both A and B". More specifically, any one of the following conditions satisfies the condition "A or B": A is true (or existent) and B is false (or absent); A is false (or absent) and B is true (or existent); and, both A and B are true (or existent).

[Surface Treatment Composition]

In some embodiments, this application provides a surface treatment composition, expressed as parts by weight, including:

a first ingredient 1 to 30 parts; and a second ingredient 1 to 30 parts, where the first ingredient is a polycaprolactone modified with an acidic group and/or with a salt of the acidic group; and the second ingredient is selected from polyether-modified polyolefin acid, polyether-modified polyalkenoate salt, polyether-modified polyalkenoate ester, or a combination thereof.

Without being limited by theory, the surface treatment composition according to this application can form an intermediate layer after being applied to a surface of a current collector foil. The intermediate layer can effectively enhance performance of bonding between the current collector foil and an active material layer, thereby increasing bonding strength and conductivity of an electrode plate.

In some embodiments, expressed as parts by weight, the content of the first ingredient in the surface treatment composition is 1 to 3 parts, 3 to 5 parts, 5 to 7 parts, 7 to 9 parts, 9 to 11 parts, 11 to 13 parts, 13 to 15 parts, 15 to 17 parts, 17 to 19 parts, 19 to 21 parts, 21 to 23 parts, 23 to 25 parts, 25 to 27 parts, 27 to 29 parts, or 29 to 30 parts.

In some embodiments, expressed as parts by weight, the content of the second ingredient in the surface treatment composition is 1 to 3 parts, 3 to 5 parts, 5 to 7 parts, 7 to 9 parts, 9 to 11 parts, 11 to 13 parts, 13 to 15 parts, 15 to 17 parts, 17 to 19 parts, 19 to 21 parts, 21 to 23 parts, 23 to 25 parts, 25 to 27 parts, 27 to 29 parts, or 29 to 30 parts.

In some embodiments, the term "polyether-modified" means "containing a polyether group" or "grafted with a polyether group".

In some embodiments, the term "polyether group" means a repeating $—(OR_B—)_nOR_A$ group. For example, the term "polyether" may include $—O\text{-alkyl-}O\text{-alkyl-}O\text{-alkyl-}O\text{-alkyl-}OR_A$. The polyether may include 1, 2, 3, 4, 5, 6, 7, 8, 9, or 10 repeating units. $R_A$ may be hydrogen, alkyl, alkenyl, alkynyl, cycloalkyl, cycloalkenyl, aryl, heteroaryl, heterocyclyl, cycloalkyl(alkyl), aryl(alkyl), heteroaryl(alkyl), or heterocyclyl(alkyl). $R_B$ may be a substituted or unsubstituted $C_1$ to $C_6$ alkylidene. $R_A$ may be further substituted or unsubstituted independently.

In some embodiments, the term "polyether polyol" means a group in which a main chain contains ether linkages (—R—O—R—, where R is an alkane or an aromatic hydrocarbon group) and in which an end-group or pendant group contains more than 2 hydroxyl groups (—OH).

In some embodiments, the polyether is prepared from a raw material by a polyaddition reaction in the presence of a catalyst, where the raw material is ethylene oxide (EO), propylene oxide (PO), butylene oxide (BO), or the like.

In some embodiments, the acidic group and/or a salt of the acidic group is selected from: an acidic group, an acidic salt group, or a combination thereof.

In some embodiments, the first ingredient is selected from: a polycaprolactone modified with an acidic group, a polycaprolactone modified with a salt of the acidic group, or a combination thereof.

In some embodiments, the acidic group and/or a salt of the acidic group is selected from an acidic group, an acidic salt group, or a combination thereof. The acidic group is selected from a hydroxyl group, a carboxylic acid group, a sulfonic acid group, or phosphoric acid group. The acidic salt group is selected from a hydroxylate group, a carboxylate group, a sulfonate group, a phosphonate group, or a combination thereof. In this way, the surface treatment composition can improve the bonding force between the current collector foil and the active material layer and enhance the bonding performance more effectively.

In some embodiments, the acidic group is selected from: a carboxylic acid group, a sulfonic acid group, a phosphoric acid group, or a combination thereof.

In some embodiments, the salt of the acidic group is selected from: a carboxylate group, a sulfonate group, a phosphonate group, or a combination thereof.

In some embodiments, the salt of the acidic group is selected from: a lithium hydroxylate group, a lithium carboxylate group, a lithium sulfonate group, a lithium phosphonate group, a sodium hydroxylate group, a sodium carboxylate group, a sodium sulfonate group, a sodium phosphonate group, or a combination thereof.

In some embodiments, the acidic group and/or a salt of the acidic group is selected from: carboxylic acid group, a sulfonic acid group, a phosphoric acid group, a carboxylate group, a sulfonate group, a phosphonate group, or a combination thereof. In this way, the surface treatment composition can improve the bonding force between the current collector foil and the active material layer and enhance the bonding performance more effectively.

In some embodiments, the surface treatment composition further includes a solvent. The solvent may be water, for example.

In some embodiments, the surface treatment composition is a surface treatment solution, such as an aqueous solution.

In some embodiments, a concentration of the first ingredient in the surface treatment solution is 1 wt % to 50 wt %, for example, 1 wt % to 10 wt %, 10 wt % to 20 wt %, 20 wt % to 30 wt %, 30 wt % to 40 wt %, or 40 wt % to 50 wt %.

In some embodiments, a weight percent of the second ingredient in the surface treatment solution is 1 wt % to 50 wt %, for example, 1 wt % to 10 wt %, 10 wt % to 20 wt %, 20 wt % to 30 wt %, 30 wt % to 40 wt %, or 40 wt % to 50 wt %.

In some embodiments, in the first ingredient, a weight percent of the acidic group and/or a salt of the acidic group is 10 wt % to 40 wt % (for example, 10% to 15%, 15% to 20%, 20% to 25%, 25% to 30%, 30% to 35%, or 35% to 40%). In this way, the surface treatment composition can improve the bonding force between the current collector foil and the active material layer and enhance the bonding performance more effectively.

In some embodiments, in the second ingredient, a weight percent of the polyether group is 20 wt % to 50 wt % (for example, 20% to 25%, 25% to 30%, 30% to 35%, 35% to 40%, 40% to 45%, or 45% to 50%). In this way, the surface treatment composition can improve the bonding force between the current collector foil and the active material layer and enhance the bonding performance more effectively.

In some embodiments, a number-average molecular weight of the first ingredient is 50,000 to 150,000 (for example, 50,000 to 80,000, 80,000 to 110,000, 110,000 to 140,000, or 140,000 to 150,000). In this way, the surface treatment composition can improve the bonding force between the current collector foil and the active material layer and enhance the bonding performance more effectively.

In some embodiments, a number-average molecular weight of the second ingredient is 6,000,000 to 10,000,000 (for example, 6,000,000 to U.S. Pat. Nos. 6,500,000, 6,500,000 to 7,000,000, 7,000,000 to U.S. Pat. Nos. 7,500,000, 7,500,000 to 8,000,000, 8,000,000 to U.S. Pat. Nos. 8,500,000, 8,500,000 to 9,000,000, 9,000,000 to 9,500,000, or 9,500,000 to 10,000,000). In this way, the surface treatment composition can improve the bonding force between the current collector foil and the active material layer and enhance the bonding performance more effectively.

In some embodiments, a solubility of the first ingredient in water at 25° C. is at least 40 g/100 ml (for example, 40 g/100 ml to 50 g/100 ml, 50 g/100 ml to 60 g/100 ml, 60 g/100 ml to 70 g/100 ml, 70 g/100 ml to 80 g/100 ml, 80 g/100 ml to 90 g/100 ml, or 90 g/100 ml to 100 g/100 ml). In this way, the surface treatment composition can improve the bonding force between the current collector foil and the active material layer and enhance the bonding performance more effectively.

In some embodiments, a solubility of the second ingredient in water at 25° C. is at least 40 g/100 ml (for example, 40 g/100 ml to 50 g/100 ml, 50 g/100 ml to 60 g/100 ml, 60 g/100 ml to 70 g/100 ml, 70 g/100 ml to 80 g/100 ml, 80 g/100 ml to 90 g/100 ml, or 90 g/100 ml to 100 g/100 ml). In this way, the surface treatment composition can improve the bonding force between the current collector foil and the active material layer and enhance the bonding performance more effectively.

In some embodiments, the first ingredient includes a substance represented by the following general formula:

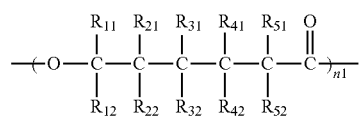

In the formula above, one or more of $R_{11}$, $R_{12}$, $R_{21}$, $R_{22}$, $R_{31}$, $R_{32}$, $R_{41}$, $R_{42}$, $R_{51}$, or $R_{52}$ are the acidic group and/or a salt of the acidic group, and remaining groups are selected from hydrogen, $C_1$ to $C_6$ alkyl, $C_1$ to $C_6$ haloalkyl, and halogen; and $n_1$ is an integer greater than or equal to 1. In this way, the surface treatment composition can improve the bonding force between the current collector foil and the active material layer and enhance the bonding performance more effectively.

In some embodiments, the $C_1$ to $C_6$ alkyl is methyl, ethyl, propyl, butyl, pentyl, or hexyl.

In some embodiments, one or more of $R_{11}$, $R_{12}$, $R_{21}$, $R_{22}$, $R_{31}$, $R_{32}$, $R_{41}$, $R_{42}$, $R_{51}$, or $R_{52}$ are selected from a carboxylic acid group, a sulfonic acid group, a phosphoric acid group, a carboxylate group, a sulfonate group, a phosphonate group, or a combination thereof.

In some embodiments, at least one of $R_{11}$, $R_{12}$, $R_{21}$, $R_{22}$, $R_{31}$, $R_{32}$, $R_{41}$, $R_{42}$, $R_{51}$, or $R_{52}$ is —OH, and at least one thereof is —COOH. In this way, the surface treatment composition can improve the bonding force between the current collector foil and the active material layer and enhance the bonding performance more effectively.

In some embodiments, at least one of $R_{11}$, $R_{12}$, $R_{21}$, $R_{22}$, $R_{31}$, $R_{32}$, $R_{41}$, $R_{42}$, $R_{51}$, or $R_{52}$ is —OH, and at least one thereof is selected from a carboxylic acid group, a sulfonic acid group, a phosphoric acid group, a carboxylate group, a sulfonate group, a phosphonate group, or a combination thereof. In this way, the surface treatment composition can improve the bonding force between the current collector foil and the active material layer and enhance the bonding performance more effectively.

In some embodiments, one of $R_{11}$, $R_{12}$, $R_{21}$, $R_{22}$, $R_{31}$, $R_{32}$, $R_{41}$, $R_{42}$, $R_{51}$, or $R_{52}$ is —OH, and one thereof is —COOH. In this way, the surface treatment composition can improve the bonding force between the current collector foil and the active material layer and enhance the bonding performance more effectively.

In some embodiments, one of $R_{11}$, $R_{12}$, $R_{21}$, $R_{22}$, $R_{31}$, $R_{32}$, $R_{41}$, $R_{42}$, $R_{51}$, or $R_{52}$ is —OH, one thereof is —COOH, and the —OH and the —COOH are linked to different carbon atoms. In this way, the surface treatment composition can improve the bonding force between the current collector foil and the active material layer and enhance the bonding performance more effectively.

In some embodiments, one of $R_{41}$ or $R_{42}$ is —OH, and one of $R_{21}$ or $R_{22}$ is —COOH. In this way, the surface treatment composition can improve the bonding force between the current collector foil and the active material layer and enhance the bonding performance more effectively.

In some embodiments, the second ingredient includes a substance represented by the following general formula:

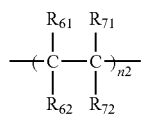

In the formula above, one or more of $R_{61}$ and $R_{62}$ are polyether groups; and $R_{71}$ is selected from a hydrogen atom, $C_1$ to $C_{10}$ alkyl, $C_1$ to $C_{10}$ haloalkyl, and halogen; $R_{72}$ is selected from carboxyl, a carboxylate group (such as a lithium carboxylate group or a sodium carboxylate group), $C_1$ to $C_3$ alkyl carboxyl, a $C_1$ to $C_3$ alkyl carboxylate group, an ester group, and a $C_1$ to $C_3$ alkyl ester group; and $n_2$ is an integer greater than or equal to 1. In this way, the surface treatment composition can improve the bonding force between the current collector foil and the active material layer and enhance the bonding performance more effectively.

In some embodiments, the $C_1$ to $C_3$ alkyl carboxyl includes methyl carboxyl, ethyl carboxyl, or propyl carboxyl.

In some embodiments, the polyether group is selected from a polyethylene glycol diglycidyl ether group, a polyether polyol group, and a combination thereof. In this way, the surface treatment composition can improve the bonding force between the current collector foil and the active material layer and enhance the bonding performance more effectively.

In some embodiments, $R_{61}$ is a hydrogen atom, and $R_{62}$ is a polyether polyol group. In this way, the surface treatment composition can improve the bonding force between the current collector foil and the active material layer and enhance the bonding performance more effectively.

In some embodiments, $R_{71}$ is a hydrogen atom, and $R_{72}$ is selected from a hydrogen atom, $C_1$ to $C_{10}$ alkyl, $C_1$ to $C_{10}$ haloalkyl, and halogen. In this way, the surface treatment composition can improve the bonding force between the current collector foil and the active material layer and enhance the bonding performance more effectively.

According to a second aspect, this application provides an electrode, including:
  a current collector;
  an active material layer, where the active material layer covers at least a part of a surface of the current collector; and
  an intermediate layer, where the intermediate layer is located between the current collector and the active material layer.

The intermediate layer contains the surface treatment composition according to any aspect described above.

In some embodiments, the binder contained in the active material layer may include at least one selected from: styrene butadiene rubber (SBR), acrylonitrile butadiene rubber, acrylic rubber, butyl rubber, fluororubber, carboxymethyl cellulose (CMC), starch, hydroxypropyl cellulose, regenerated cellulose, polyvinyl alcohol (PVA), polyacrylic acid (PAA), polyethylene glycol (PEG), polyacrylonitrile (PAN), and polyacrylamide (PAM). In this way, the surface treatment composition can improve the bonding force between the current collector foil and the active material layer and enhance the bonding performance more effectively.

In some embodiments, the active material layer contains at least a binder styrene-butadiene rubber. In this way, the surface treatment composition can improve the bonding force between the current collector foil and the active material layer and enhance the bonding performance more effectively.

In some embodiments, the electrode is a negative electrode. In this way, the surface treatment composition can improve the bonding force between the current collector foil and the active material layer and enhance the bonding performance more effectively.

In some embodiments, a material of the current collector includes copper or a copper alloy. In this way, the surface treatment composition can improve the bonding force between the current collector foil and the active material layer and enhance the bonding performance more effectively.

In some embodiments, the method for preparing an electrode includes:
(1) applying a surface treatment composition onto the surface of a current collector; and
(2) overlaying the surface of the current collector, to which the surface treatment composition is applied, with an active material layer.

According to a third aspect, this application provides a secondary battery, including the electrode according to any aspect described above. In this way, the surface treatment composition can improve the bonding force between the current collector foil and the active material layer and enhance the bonding performance more effectively.

According to a fourth aspect, this application provides a device, including the secondary battery according to any aspect described above. The secondary battery is configured to provide electrical energy to the device. In this way, the surface treatment composition can improve the bonding force between the current collector foil and the active material layer and enhance the bonding performance more effectively.

[Secondary Battery]

A secondary battery, also known as a rechargeable battery or storage battery, is a battery that is reusable after an active material in the battery is activated by charging the battery that has been discharged.

Generally, a secondary battery includes a positive electrode plate, a negative electrode plate, a separator, and an electrolytic solution. During charge and discharge of the battery, active ions (such as lithium ions) are shuttled between the positive electrode plate and the negative electrode plate by intercalation and deintercalation. Disposed between the positive electrode plate and the negative electrode plate, the separator primarily serves to prevent a short circuit between the positive electrode plate and the negative electrode plate, and is penetrable by the active ions. The electrolytic solution is located between the positive electrode plate and the negative electrode plate, and primarily serves to conduct the active ions.

[Positive Electrode Plate]

A positive electrode plate generally includes a positive current collector and a positive film layer that overlays at least one surface of the positive current collector. The positive film layer includes a positive active material. A surface treatment composition may be disposed between the positive current collector and the positive film layer.

As an example, the positive current collector includes two surfaces opposite to each other in a thickness direction of the positive current collector. The positive film layer is disposed on either or both of the two opposite surfaces of the positive current collector.

In some embodiments, the positive current collector may be a metal foil or a composite current collector. For example, the metal foil may be an aluminum foil. The composite current collector may include a polymer material substrate and a metal layer formed on at least one surface of the polymer material substrate. The composite current collector may be formed by overlaying the polymer material substrate with a metal material (for example, aluminum, aluminum alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the positive active material may be a positive active material that is well known for use in a battery in the art. As an example, the positive active material may include at least one of the following materials: olivine-structured lithium-containing phosphate, lithium transition metal oxide, and a modified compound thereof. However, this application is not limited to such materials, and other conventional materials usable as a positive active material of a battery may be used instead. One of the positive active materials may be used alone, or at least two thereof may be used in combination. Examples of the lithium transition metal oxide may include, but without being limited to, at least one of lithium cobalt oxide (such as $LiCoO_2$), lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide, lithium nickel cobalt manganese oxide (such as $LiNi_{1/3}Co_{1/3}Mn_{1/3}O_2$ (briefly referred to as NCM333), $LiNi_{0.5}Co_{0.2}Mn_{0.3}O_2$ (briefly referred to as NCM523), $LiNi_{0.5}Co_{0.25}Mn_{0.25}O_2$ (briefly referred to as NCM211), $LiNi_{0.6}Co_{0.2}Mn_{0.2}O_2$ (briefly referred to as NCM622), $LiNi_{0.5}Co_{0.1}Mn_{0.1}O_2$ (briefly referred to as NCM811)), lithium nickel cobalt aluminum oxide (such as $LiNi_{0.85}Co_{0.15}Al_{0.05}O_2$), or a modified compound thereof. Examples of the olivine-structured lithium-containing phosphate may include, but without being limited to, at least one of lithium iron phosphate (such as $LiFePO_4$ (briefly referred to as LFP)), a composite of lithium iron phosphate and carbon, lithium manganese phosphate (such as $LiMnPO_4$), a composite of lithium manganese phosphate and carbon, lithium manganese iron phosphate, or a composite of lithium manganese iron phosphate and carbon.

In some embodiments, the positive film layer further optionally includes a surface treatment composition. As an example, the surface treatment composition may include at least one of polyvinylidene difluoride (PVDF), polytetrafluoroethylene (PTFE), poly(vinylidene fluoride-co-tetrafluoroethylene-co-propylene), poly (vinylidene fluoride-co-hexafluoropropylene-co-tetrafluoroethylene), poly (tetrafluoroethylene-co-hexafluoropropylene), or fluorinated acrylate resin.

In some embodiments, the positive film layer further optionally includes a conductive agent. As an example, the conductive agent may include at least one of superconductive carbon, acetylene black, carbon black, Ketjen black, carbon dots, carbon nanotubes, graphene, or carbon nanofibers.

In some embodiments, the positive electrode plate may be prepared according to the following method: dispersing the ingredients of the positive electrode plate such as the positive active material, the conductive agent, the surface treatment composition, and any other ingredients into a solvent (such as N-methyl-pyrrolidone) to form a positive slurry, coating a positive current collector with the positive slurry, and performing steps such as drying and cold calendering to obtain the positive electrode plate.

[Negative Electrode Plate]

The negative electrode plate includes a negative current collector and a negative film layer disposed on at least one surface of the negative current collector. The negative film layer includes a negative active material. A surface treatment composition may be disposed between the negative current collector and the negative film layer.

As an example, the negative current collector includes two surfaces opposite to each other in a thickness direction of the negative current collector. The negative film layer is disposed on either or both of the two opposite surfaces of the negative current collector.

In some embodiments, the negative current collector may be a metal foil or a composite current collector. For example, the metal foil may be a copper foil. The composite current collector may include a polymer material substrate and a metal layer formed on at least one surface of the polymer material substrate. The composite current collector may be formed by overlaying the polymer material substrate with a metal material (for example, copper, copper alloy, nickel, nickel alloy, titanium, titanium alloy, silver, and silver alloy). The polymer material substrate may be, for example, polypropylene (PP), polyethylene terephthalate (PET), polybutylene terephthalate (PBT), polystyrene (PS), or polyethylene (PE).

In some embodiments, the negative active material may be a negative active material well known for use in a battery in the art. As an example, the negative active material may include at least one of the following materials: artificial graphite, natural graphite, soft carbon, hard carbon, silicon-based material, tin-based material, lithium titanium oxide, and the like. The silicon-based material may be at least one selected from simple-substance silicon, a silicon-oxygen compound, a silicon-carbon composite, a silicon-nitrogen composite, and a silicon alloy. The tin-based material may be at least one selected from simple-substance tin, a tin-oxygen compound, or a tin alloy. However, this application is not limited to such materials, and other conventional materials usable as a negative active material of a battery may be used instead. One of the negative active materials may be used alone, or at least two thereof may be used in combination.

In some embodiments, the negative film layer further optionally includes a surface treatment composition. As an example, the surface treatment composition may be at least one selected from styrene-butadiene rubber (SBR), polyacrylic acid (PAA), polyacrylic acid sodium (PAAS), polyacrylamide (PAM), polyvinyl alcohol (PVA), sodium alginate (SA), polymethyl acrylic acid (PMAA), and carboxymethyl chitosan (CMCS).

In some embodiments, the negative film layer further optionally includes a conductive agent. As an example, the conductive agent may be at least one selected from superconductive carbon, acetylene black, carbon black, Ketjen black, carbon dots, carbon nanotubes, graphene, or carbon nanofibers.

In some embodiments, the negative film layer further optionally includes other agents, such as a thickener (for example, sodium carboxymethyl cellulose (CMC-Na)).

In some embodiments, the negative electrode plate may be prepared according to the following method: dispersing the ingredients of the negative electrode plate such as the negative active material, the conductive agent, the surface treatment composition, and any other ingredients in a solvent (such as deionized water) to form a negative slurry, coating a negative current collector with the negative slurry, and performing steps such as drying and cold calendering to obtain a negative electrode plate.

[Electrolyte]

The electrolyte serves to conduct ions between the positive electrode plate and the negative electrode plate. The type of the electrolyte is not particularly limited in this application, and may be selected as required. For example, the electrolyte may be in a liquid state or gel state, or all solid state.

In some embodiments, the electrolyte is in a liquid state and includes an electrolyte salt and a solvent.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluoro(oxalato)borate, lithium bis(oxalato)borate, lithium difluoro(bisoxalato) phosphate, and lithium tetrafluoro(oxalato)phosphate.

In some embodiments, the solvent may be at least one selected from ethylene carbonate, propylene carbonate, ethyl methyl carbonate, diethyl carbonate, dimethyl carbonate, dipropyl carbonate, methyl propyl carbonate, ethylene propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, methyl sulfonyl methane, ethyl methyl sulfone, and (ethylsulfonyl)ethane.

In some embodiments, the electrolytic solution further optionally includes an additive. As an example, the additive may include a negative film-forming additive or a positive film-forming additive. The additive may further include an additive capable of improving some performance of the battery, for example, an additive for improving overcharge performance of the battery, or an additive for improving high- or low-temperature performance of the battery.

[Separator]

In some embodiments, the secondary battery further includes a separator. The type of the separator is not particularly limited in this application, and may be any well-known porous separator that is highly stable both chemically and mechanically.

In some embodiments, the separator may be made of a material that is at least one selected from glass fiber, non-woven fabric, polyethylene, polypropylene, or polyvinylidene difluoride. The separator may be a single-layer film or a multilayer composite film, without being particularly limited. When the separator is a multilayer composite film, materials in different layers may be identical or different, without being particularly limited.

In some embodiments, the positive electrode plate, the negative electrode plate, and the separator may be made into an electrode assembly by winding or stacking.

In some embodiments, the secondary battery may include an outer package. The outer package may be configured to package the electrode assembly and the electrolyte.

In some embodiments, the outer package of the secondary battery may be a hard shell such as a hard plastic shell, an aluminum shell, a steel shell, or the like. Alternatively, the outer package of the secondary battery may be a soft package such as a pouch-type soft package. The soft package may be made of plastic such as polypropylene, polybutylene terephthalate, or polybutylene succinate.

The shape of the secondary battery is not particularly limited in this application, and may be cylindrical, prismatic or any other shape. For example, FIG. 3 shows an overall view and an exploded view of a prismatic secondary battery 5 as an example.

Figure 3:
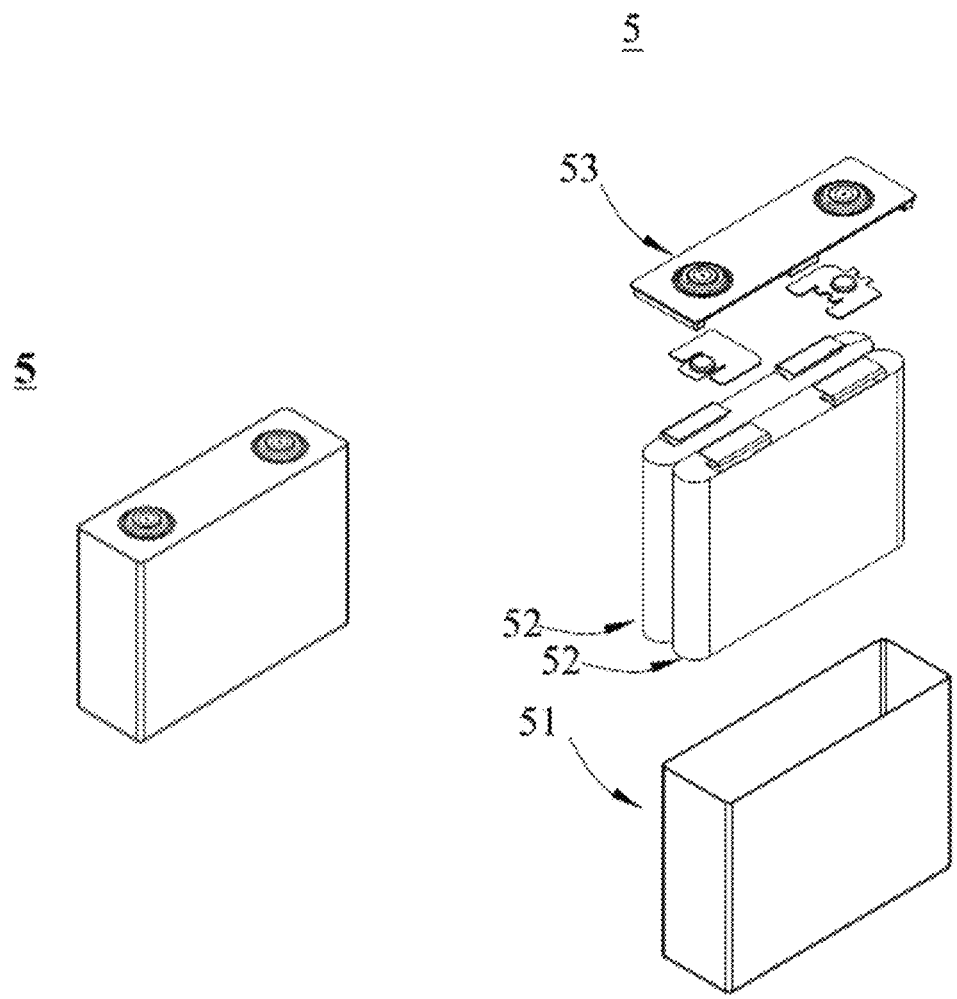
FIG. 3 is an overall view and an exploded view of a secondary battery according to an embodiment of this application.

In some embodiments, referring to FIG. 3, the outer package may include a housing 51 and a cover plate 53. The housing 51 may include a bottom plate and a side plate connected to the bottom plate. The bottom plate and the side plate close in to form an accommodation cavity. An opening that communicates with the accommodation cavity is made on the housing 51. The cover plate 53 can fit and cover the opening to close the accommodation cavity. The positive electrode plate, the negative electrode plate, and the separator may be made into the electrode assembly 52 by winding or stacking. The electrode assembly 52 is packaged in the accommodation cavity. The electrolytic solution infiltrates in the electrode assembly 52. The number of electrode assemblies 52 in a secondary battery 5 may be one or more, and may be selected by a person skilled in the art as actually required.

In some embodiments, the secondary battery may be assembled into a battery module. The battery module may include one or more secondary batteries, and the specific number of secondary batteries in a battery module may be selected by a person skilled in the art depending on practical applications and capacity of the battery module.

Figure 4:
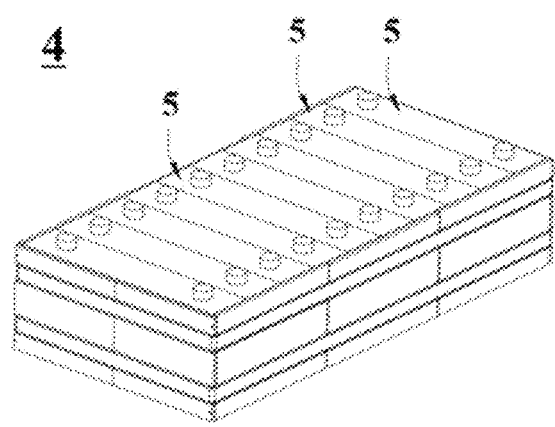
FIG. 4 is a schematic diagram of a battery module according to an embodiment of this application.

FIG. 4 shows a battery module 4 as an example. Referring to FIG. 4, in the battery module 4, a plurality of secondary batteries 5 may be arranged sequentially along a length direction of the battery module 4. Alternatively, the secondary batteries may be arranged in any other manner. Further, the plurality of secondary batteries 5 may be fixed by a fastener.

Optionally, the battery module 4 may further include a shell that provides an accommodation space. The plurality of secondary batteries 5 are accommodated in the accommodation space.

In some embodiments, the battery module may be assembled to form a battery pack. The battery pack may include one or more battery modules, and the specific number of battery modules in a battery pack may be selected by a person skilled in the art depending on practical applications and capacity of the battery pack.

Figure 5:
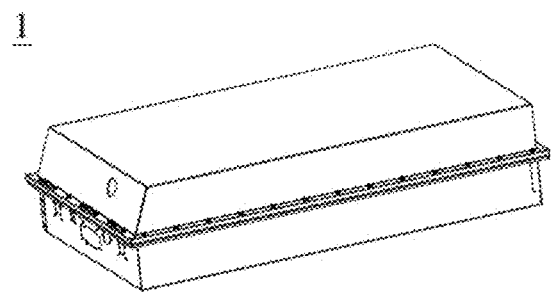
FIG. 5 is a schematic diagram of a battery pack according to an embodiment of this application.
Figure 6:
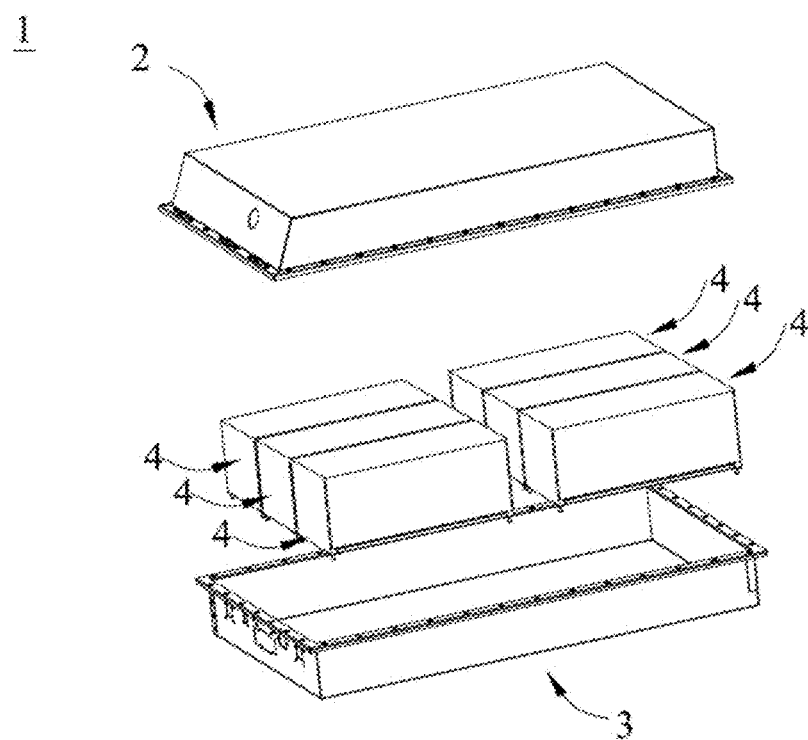
FIG. 6 is an exploded view of the battery pack shown in FIG. 5 according to an embodiment of this application.

FIG. 5 and FIG. 6 show a battery pack 1 as an example. Referring to FIG. 5 and FIG. 6, the battery pack 1 may include a battery box and a plurality of battery modules 4 disposed in the battery box. The battery box includes an upper box 2 and a lower box 3. The upper box 2 fits the lower box 3 to form a closed space for accommodating the battery modules 4. The plurality of battery modules 4 may be arranged in the battery box in any manner.

Further, this application provides an electrical device. The electrical device includes at least one of the secondary battery, the battery module, or the battery pack according to this application. The secondary battery, the battery module, or the battery pack may be used as a power supply of the electrical device, or used as an energy storage unit of the electrical device. The electrical device may include, but without being limited to, a mobile device (such as a mobile phone or a laptop computer), an electric vehicle (such as a battery electric vehicle, a hybrid electric vehicle, a plug-in hybrid electric vehicle, an electric bicycle, an electric scooter, an electric golf cart, or an electric truck), an electric train, a ship, a satellite system, or an energy storage system.

The secondary battery, the battery module, or the battery pack may be selected for use in the electrical device according to practical requirements of the electrical device.

Figure 7:
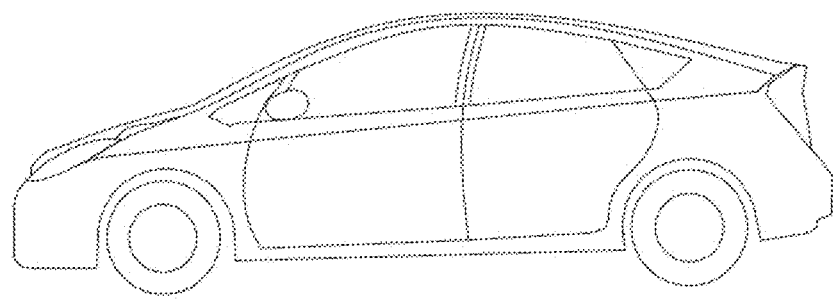
FIG. 7 is a schematic diagram of an electrical device that uses a secondary battery as a power supply according to an embodiment of this application.

FIG. 7 shows an electrical device as an example. The electrical device may be a battery electric vehicle, a hybrid electric vehicle, a plug-in hybrid electric vehicle, or the like. The electrical device may adopt a battery pack or a battery module in order to meet the requirements of the electrical device on a high power and a high energy density of the secondary battery.

EMBODIMENTS

The following describes embodiments of this application. The embodiments described below are illustrative, and are merely intended to construe this application but not to limit this application. Unless other techniques or conditions are expressly specified in an embodiment hereof, the techniques or conditions described in the literature in this field or in an instruction manual of the product may apply. A reagent or instrument used herein without specifying the manufacturer is a conventional product that is commercially available in the market.

I. Details of Raw Materials

The raw materials used in some embodiments are shown below:

TABLE 1

| Serial number | Manufacturer | Parameter |
|---|---|---|
| Ingredient 1.1 | BYK | Number-average molecular weight 60,000 |
| Ingredient 1.2 | BYK | Number-average molecular weight 100,000 |
| Ingredient 1.3 | BYK | Number-average molecular weight 70,000 |
| Ingredient 1.4 | BYK | Number-average molecular weight 120,000 |
| Ingredient 1.5 | BYK | Number-average molecular weight 90,000 |
| Ingredient 1.6 | BYK | Number-average molecular weight 150,000 |
| Ingredient 1.7 | BYK | Number-average molecular weight 50,000 |
| Ingredient 1.8 | BYK | Number-average molecular weight 150,000 |
| Ingredient 1.9 | BYK | Number-average molecular weight 100,000 |
| Ingredient 2.1 | BYK | Number-average molecular weight 1,100,000 |
| Ingredient 2.2 | BYK | Number-average molecular weight 400,000 |
| Ingredient 2.3 | BYK | Number-average molecular weight 1,000,000 |
| Ingredient 2.4 | BYK | Number-average molecular weight 400,000 |
| Ingredient 2.5 | BYK | Number-average molecular weight 950,000 |
| Sodium carboxymethyl cellulose | Commercially available | Relative molecular weight 400,000 to 600,000 |
| Styrene-butadiene emulsion | Commercially available | Solid content 48% |

*BYK is an abbreviation of BYK Additives Co., Ltd.

Ingredients 1 and 2 are a polycaprolactone modified with an acid group, represented by a general formula:

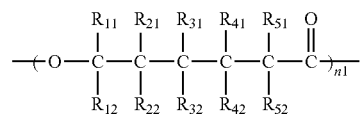

In the formula above, $n_1$ is an integer greater than or equal to 1.

The groups $R_{11}$, $R_{12}$, $R_{21}$, $R_{22}$, $R_{31}$, $R_{32}$, $R_{41}$, $R_{42}$, $R_{51}$, and $R_{52}$ of ingredients 1.1 to 1.9 are shown in the following table:

TABLE 2

| Ingredient 1 | $R_{11}$ | $R_{21}$ | $R_{31}$ | $R_{41}$ | $R_{51}$ | $R_{12}$ | $R_{22}$ | $R_{32}$ | $R_{42}$ | $R_{52}$ |
|---|---|---|---|---|---|---|---|---|---|---|
| 1.1 | H | —COOH | H | —OH | H | H | H | H | H | H |
| 1.2 | H | —SO$_3$H | H | —OH | H | H | H | H | H | H |
| 1.3 | H | —COOH | H | —OH | H | H | H | —CH$_3$ | —CH$_3$ | H |
| 1.4 | H | —COOH | H | —OH | H | H | H | —CH$_2$Cl | —CH$_2$Cl | H |
| 1.5 | H | —COOH | H | —OH | H | —COOH | H | H | H | H |
| 1.6 | H | —COOH | H | —OH | H | —COOH | H | —COOH | H | H |

TABLE 2-continued

| Ingredient 1 | $R_{11}$ | $R_{21}$ | $R_{31}$ | $R_{41}$ | $R_{51}$ | $R_{12}$ | $R_{22}$ | $R_{32}$ | $R_{42}$ | $R_{52}$ |
|---|---|---|---|---|---|---|---|---|---|---|
| 1.7 | H | —OH | H | —OH | H | H | H | —OH | H | H |
| 1.8 | H | —COOH | H | —COOH | H | H | H | —COOH | H | H |
| 1.9 | H | —PO(OH)$_2$ | H | —OH | H | H | H | H | H | H |

The ingredient 2 is a polyether-modified polyacrylic ester, and is represented by a general formula:

In the formula above, $n_2$ is an integer greater than or equal to 1.

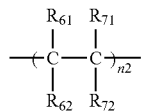

The groups $R_{61}$, $R_{62}$, $R_{71}$, and $R_{72}$ of ingredients 2.1 to 2.5 are shown in the following table:

TABLE 3

| Ingredient 2 | $R_{61}$ | $R_{62}$ | $R_{71}$ | $R_{72}$ |
|---|---|---|---|---|
| 2.1 | H | Polyether polyol group | H | —COOLi |
| 2.2 | H | Polyether polyol group | H | —COOH |
| 2.3 | H | Polyether polyol group | H | —COOC$_2$H$_5$ |
| 2.4 | H | Polyether polyol group | H | —COOLi |
| 2.5 | H | Polyether polyol group | H | —C$_2$H$_4$—COOLi |

The structural formula of the polyether polyol group in Table 3 is:

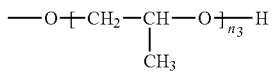

In the formula above, $n_3$ is an integer greater than or equal to 1.

II. Ingredients of a Surface Treatment Solution

TABLE 4

| Serial number | Serial number of surface treatment solution | Ingredient 1 | Concentration | Ingredient 2 | Concentration |
|---|---|---|---|---|---|
| Embodiment 1 | S1 | Ingredient 1-1 | 1 wt % | Ingredient 2-1 | 30 wt % |
| Embodiment 2 | S2 | Ingredient 1-1 | 5 wt % | Ingredient 2-1 | 26 wt % |
| Embodiment 3 | S3 | Ingredient 1-1 | 12 wt % | Ingredient 2-1 | 18 wt % |
| Embodiment 4 | S4 | Ingredient 1-1 | 20 wt % | Ingredient 2-1 | 11 wt % |
| Embodiment 5 | S5 | Ingredient 1-1 | 30 wt % | Ingredient 2-1 | 1 wt % |
| Embodiment 6 | S6 | Ingredient 1-2 | 12 wt % | Ingredient 2-1 | 18 wt % |
| Embodiment 7 | S7 | Ingredient 1-3 | 12 wt % | Ingredient 2-1 | 18 wt % |
| Embodiment 8 | S8 | Ingredient 1-4 | 12 wt % | Ingredient 2-1 | 18 wt % |
| Embodiment 9 | S9 | Ingredient 1-5 | 12 wt % | Ingredient 2-1 | 18 wt % |
| Embodiment 10 | S10 | Ingredient 1-6 | 12 wt % | Ingredient 2-1 | 18 wt % |
| Embodiment 11 | S11 | Ingredient 1-7 | 12 wt % | Ingredient 2-1 | 18 wt % |
| Embodiment 12 | S12 | Ingredient 1-8 | 12 wt % | Ingredient 2-1 | 18 wt % |
| Embodiment 13 | S13 | Ingredient 1-9 | 12 wt % | Ingredient 2-1 | 18 wt % |
| Embodiment 14 | S14 | Ingredient 1-1 | 12 wt % | Ingredient 2-2 | 18 wt % |
| Embodiment 15 | S15 | Ingredient 1-1 | 12 wt % | Ingredient 2-3 | 18 wt % |
| Embodiment 16 | S16 | Ingredient 1-1 | 12 wt % | Ingredient 2-4 | 18 wt % |
| Embodiment 17 | S17 | Ingredient 1-1 | 12 wt % | Ingredient 2-5 | 18 wt % |
| Comparative Embodiment 1 | D1 | — | — | — | — |
| Comparative Embodiment 2 | D2 | Ingredient 1-1 | 12 wt % | — | — |
| Comparative Embodiment 3 | D3 | — | — | Ingredient 2-1 | 18 wt % |
| Comparative Embodiment 4 | D4 | Ingredient 1-1 | 0.6 wt % | Ingredient 2-1 | 30 wt % |
| Comparative Embodiment 5 | D5 | Ingredient 1-1 | 30 wt % | Ingredient 2-1 | 0.6 wt % |

III. Formula of an Active Material Slurry

On a dry weight basis, mixing graphite (active material), sodium carboxymethyl cellulose (dispersant), styrene-butadiene emulsion (binder), carbon black (conductive agent) at a ratio of 96.2:1.0:1.8:1.0, and stirring well to obtain an active material slurry (negative slurry).

IV. Preparing an Electrode (Negative Electrode)

Embodiment 1

FIG. 1 is a schematic flowchart of preparing an electrode. As shown in the drawing, a method for preparing an electrode includes the following steps:

(1) An unwinder 81 conveys an current collector 11 to a next-step position;

(2) A first sprayer 82 sprays a surface treatment solution S1 onto a first side 111 of the current collector 11 by an amount of approximately 1.0±0.5 mg/1540.25 mm$^2$, and the spraying product is conveyed to a next-step position;

(3) A first active material slurry applicator 83 applies an active material slurry, by an amount of 186±3 mg/1540.25 mm$^2$, onto the first side 111 of the current collector 11 on which the surface treatment solution S1 is sprayed, and the product is conveyed to a next-step position;

(4) A first dryer 84 dries the current collector 11 coated with the slurry, and the product is conveyed to a next-step position;

(5) A second sprayer 85 sprays the surface treatment solution S1 onto a second side 112 of the current collector 11 by an amount of approximately 1.0±0.5 mg/1540.25 mm$^2$, and the product is conveyed to a next-step position;

(6) A second active material slurry applicator 86 applies the active material slurry, by an amount of 186±3 mg/1540.25 mm$^2$, onto the second side 112 of the current collector 11 on which the surface treatment solution S1 is sprayed, and the product is conveyed to a next-step position;

(7) A second dryer 87 dries the current collector 11 coated with the slurry, and the product is conveyed to a next-step position;

(8) A rewinder 88 collects and winds up the product to obtain a jelly-roll electrode; and (9) Cold-calendering the dried electrode plate on rollers under a pressure of 30 T and at a speed of 1.5 m/min, where a compacted density of the active material is 1.67 g/cm$^3$. An electrolytic product in Embodiment 1 is obtained after the cold calendering.

Embodiments 2 to 17

Embodiments 2 to 17 differ from Embodiment 1 in that the surface treatment solution (S2 to S17) set out in Table 4 and corresponding to each embodiment is used in place of the surface treatment solution S1 used in Embodiment 1. Other steps and parameters are identical to those in Embodiment 1.

Comparative Embodiment 1-7

Comparative Embodiments 1 to 7 differ from Embodiment 1 in that the surface treatment solution (D1 to D5) set out in Table 4 and corresponding to each comparative embodiment is used in place of the surface treatment solution S1 used in Embodiment 1. Other steps and parameters are identical to those in Embodiment 1. The surface treatment solution D1 is pure water containing neither the ingredient 1 nor the ingredient 2.

IV. Testing the Electrode Performance (1) Testing Surface Energy

A method for testing the surface energy is described below:

a) Take a group of substrates that have been treated with the treatment solution, and ensure that the surface of each substrate is free of particles and dirt;

b) Hold each dyne test pen firmly and vertically, and draw a straight-line stroke firmly and evenly along the entire width of the surface of the copper foil by using 40 #, 38 #, 36 #, 34 #, 32 #, and 30 #dyne test pens separately to test the wetting, where the length of the stroke is approximately 100 mm; and c) Two seconds later, visually observe the shrinkage of the stroke, find an unbroken stroke that does not shrink into water droplets, and use the model of the corresponding dyne test pen to represent the surface energy.

Table 5 shows the test results.

(2) Testing the Tensile Strength

A method for testing the tensile strength is described below:

a) Die-cut each group of substrates treated with the treatment solution into 152 mm×15 mm sheets by using a ring crush specimen cutting machine so that specimens are cut out from the substrates along a transverse direction (TD) (length direction of a web) and a machine direction (MD) (width direction of the web) according to a sampling plan, and take 5 consecutive sheets of each specimen.

b) Fix and clamp each of the sheets firmly perpendicular to a chuck of a GoTech tensile test machine, where the up-down distance of the original chuck is 5 cm.

c) Set the parameters of the GoTech tensile test machine, select "tensile" as the type of the material test, set the running speed to 50 mm/min, and tap "Stop", "Reset", and "Run".

d) After the specimen is stretched, check whether the copper foil in the specimen is broken in the middle. Start over with a new specimen if the breakage is caused by looseness of the clamp or other factors. After completion of testing each specimen, convert the measured value into a final value expressed in an appropriate unit, and record the final value. The breaking strength represents tensile strength, and the breaking distance represents a elongation rate.

e) Using an average value of the five sheets as the final value.

Table 5 shows the test results.

(3) Testing the Bonding Strength

A method for testing the bonding strength is described below:

a) Cut out a specimen of 30 mm (width)×(100 mm to 160 mm) (length) in size from an electrode plate under test by using a cutter.

b) Affix special-purpose double-sided tape onto a steel sheet of 30 mm (width)×160 mm (length) in size, where the size of the tape is 20 mm (width)×(90 mm to 150 mm) (length).

c) Affix the electrode plate specimen taken in step 1 onto the double-sided tape, with the test side facing down. Roll the specimen for three times along the same direction by using a roller.

d) Insert a paper tape beneath the electrode plate and fix the paper tape by using a crepe adhesive, where the width of the paper tape is equal to the width of the electrode plate, and the length of the paper tape is 80 to 200 mm greater than the length of the electrode plate specimen;

e) Turn on the SUNS tensile tester so that the indicator is on, and adjust the stop block to the test position exactly;

f) Use a lower clamp to fix an end of the steel sheet, where the end is an end affixed to no electrode plate;

g) Fold the paper tape upward, fix the paper tape with an upper clamp, and adjust the position of the upper clamp by using an "Up" button and a "Down" button on a manual controller shipped together with the tensile tester;

h) Start up a special-purpose computer linked to the tensile machine, and test the tensile force by using "Materialtest" software;

i) After linking to the tensile tester, confirming that a force sensor parameter is "500 N", and then click "OK"; and j) Reset the value after pre-stretching the specimen to a steady state, and then start the test. When the test curve becomes flat and the displacement is greater than 70 mm, stop stretching, and read and record the average value of the flat part of the curve.

(4) Testing the Film Resistance

A method for testing the film resistance is described below:
- a) Take a specimen of 4 cm×25 cm in size along the machine direction (MD);
- b) Open a main air valve connected to an internal resistance meter, and turn on the internal resistance meter. Dip dust-free paper in anhydrous ethanol, and then clean the upper and lower probes of the internal resistance meter by using the dust-free paper; and
- c) Put the current collector of the electrode plate under test in the middle of the probe, click the "Run" button on the software first. 15 seconds later, the software automatically collects the film resistance data.

Table 5 shows the test results.

bonding strength of the surface treatment solution are 6.7%, 5.3%, and 10%, respectively, in contrast to Comparative Embodiment 5.

The surface treatment solution in Embodiment 3 contains both the ingredient 1 (12 wt %) and the ingredient 2 (18 wt %), and the increase rates of the surface energy, tensile strength, and bonding strength of the surface energy solution are 33.3%, 33.3%, and 65%, respectively, in contrast to Comparative Embodiment 4, and are significantly higher than a simple sum of the three values in Comparative Embodiments 1 and 2 separately. The above results indicate that a synergistic effect is achieved between the polycaprolactone modified with the acid group or with a salt of the acidic group and the polyether-modified polyacrylic ester.

TABLE 5

| Serial number | Surface energy (mN/m) | Increase rate of surface energy | Tensile strength (kg) | Increase rate of tensile strength | Bonding strength (N/m) | Increase rate of bonding strength | Film resistance (mOhm) | Increase rate of resistance |
|---|---|---|---|---|---|---|---|---|
| Embodiment 1 | 36 | 20.0% | 35 | 16.7% | 14.7 | 47.0% | 3.2 | 6.7% |
| Embodiment 2 | 38 | 26.7% | 37 | 23.3% | 15.5 | 55.0% | 3.4 | 13.3% |
| Embodiment 3 | 40 | 33.3% | 40 | 33.3% | 16.5 | 65.0% | 2.9 | −3.3% |
| Embodiment 4 | 36 | 20.0% | 34 | 13.3% | 14 | 40.0% | 3.2 | 6.7% |
| Embodiment 5 | 34 | 13.3% | 34.5 | 15.0% | 14.6 | 46.0% | 3.1 | 3.3% |
| Embodiment 6 | 40 | 33.3% | 39 | 30.0% | 16 | 60.0% | 3.2 | 6.7% |
| Embodiment 7 | 40 | 33.3% | 39.5 | 31.7% | 16.5 | 65.0% | 3.2 | 6.7% |
| Embodiment 8 | 40 | 33.3% | 38.9 | 29.7% | 16 | 60.0% | 3.1 | 3.3% |
| Embodiment 9 | 40 | 33.3% | 40 | 33.3% | 16.3 | 63.0% | 3.2 | 6.7% |
| Embodiment 10 | 40 | 33.3% | 42 | 40.0% | 17 | 70.0% | 3.1 | 3.3% |
| Embodiment 11 | 40 | 33.3% | 38 | 26.7% | 15 | 50.0% | 3.1 | 3.3% |
| Embodiment 12 | 40 | 33.3% | 41 | 36.7% | 16.4 | 64.0% | 3 | 0.0% |
| Embodiment 13 | 40 | 33.3% | 39 | 30.0% | 16.3 | 63.0% | 3.2 | 6.7% |
| Embodiment 14 | 40 | 33.3% | 39.1 | 30.3% | 16.3 | 63.0% | 3 | 0.0% |
| Embodiment 15 | 40 | 33.3% | 38.9 | 29.7% | 16.4 | 64.0% | 3.1 | 3.3% |
| Embodiment 16 | 40 | 33.3% | 39.2 | 30.7% | 16.2 | 62.0% | 3.2 | 6.7% |
| Embodiment 17 | 40 | 33.3% | 38.8 | 29.3% | 16.4 | 64.0% | 3 | 0.0% |
| Comparative Embodiment 1 | 30 | Serving as a reference value | 30 | Serving as a reference value | 10 | Serving as a reference value | 3 | Serving as a reference value |
| Comparative Embodiment 2 | 30 | 0.0% | 32 | 6.7% | 11.5 | 15.0% | 3.1 | 3.3% |
| Comparative Embodiment 3 | 32 | 6.7% | 31.6 | 5.3% | 11 | 10.0% | 3.5 | 16.7% |
| Comparative Embodiment 4 | 34 | 13.3% | 32 | 6.7% | 12 | 20.0% | 6 | 100.0% |
| Comparative Embodiment 5 | 32 | 6.7% | 32 | 6.7% | 12.5 | 25.0% | 6 | 100.0% |

Note: The measured values of Comparative Embodiment 1 serve as reference values for the increase rate of surface energy, the increase rate of tensile strength, the increase rate of bonding strength, and the increase rate of resistance.

Increase rate=$(X_2-X_1)/X_1$, where $X_1$ is a reference value, and $X_2$ is a value against the reference value.

The test results are analyzed below:

Considering that the surface treatment solution in Comparative Embodiment 1 contains neither the ingredient 1 nor the ingredient 2, the performance of the electrode plate in Comparative Embodiment 1 serves as a reference.

The surface treatment solution in Comparative Embodiment 2 contains the ingredient 1 (12 wt %) alone, and the increase rates of the surface energy, tensile strength, and bonding strength of the surface treatment solution are 0%, 6.7%, and 15%, respectively, in contrast to Comparative Embodiment 1.

The surface treatment solution in Comparative Embodiment 3 contains the ingredient 2 (18 wt %) alone, and the increase rates of the surface energy, tensile strength, and The ingredients 1 and 2 in Comparative Embodiments 4 to 5 are added at a weight percent falling beyond the range specified in this application, and therefore, fail to achieve a synergistic effect, and fail to effectively improve the surface energy, tensile strength, and bonding strength of the electrode plate.

The above test results show that this application successfully provides a novel surface treatment composition that, expressed as parts by weight, includes: a first ingredient 1 to 30 parts; and a second ingredient 1 to 30 parts. The first ingredient is a polycaprolactone modified with an acidic group and/or with a salt of the acidic group; and the second ingredient is selected from polyether-modified polyolefin acid, polyether-modified polyalkenoate salt, polyether-modified polyalkenoate ester, or a combination thereof.

The novel surface treatment composition according to this application is configured to treat a current collector, and exhibits one or more of the following beneficial effects:

(1) Surface energy of the current collector treated with the surface treatment composition is enhanced;

(2) Tensile performance of the electrode prepared from the current collector treated with the surface treatment composition is enhanced;

(3) Bonding strength between the active material layer and the current collector is enhanced after the current collector is treated with the surface treatment composition; and (4) After the current collector is treated with the surface treatment composition, the bonding force between a binder ingredient (styrene-butadiene rubber) in the active material layer and the surface-treated electrode plate is enhanced. Therefore, during drying of the active material layer, the binder ingredient is not prone to segregate away from the current collector with the evaporation of moisture caused by the drying.

It is hereby noted that this application is not limited to the foregoing embodiments. The foregoing embodiments are merely examples. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A surface treatment composition, comprising, expressed as parts by weight:
    a first ingredient of 1 to 30 parts; and
    a second ingredient of 1 to 30 parts;
    wherein:
        the first ingredient is a polycaprolactone modified with an acidic group and/or a salt of the acidic group; and
        the second ingredient is selected from polyether-modified polyolefin acid, polyether-modified polyalkenoate salt, polyether-modified polyalkenoate ester, or a combination thereof.

2. The surface treatment composition according to claim 1, wherein:
    the acidic group and/or the salt of the acidic group is selected from an acidic group, an acidic salt group, or a combination thereof;
    the acidic group is selected from a hydroxyl group, a carboxylic acid group, a sulfonic acid group, or phosphoric acid group; and
    the acidic salt group is selected from a hydroxylate group, a carboxylate group, a sulfonate group, a phosphonate group, or a combination thereof.

3. The surface treatment composition according to claim 1, wherein:
    in the first ingredient, a weight percent of the acidic group and/or the salt of the acidic group is 10 wt % to 40 wt %; and/or
    in the second ingredient, a weight percent of a polyether group is 20 wt % to 50 wt %.

4. The surface treatment composition according to claim 1, wherein:
    a number-average molecular weight of the first ingredient is 50,000 to 150,000; and/or
    a number-average molecular weight of the second ingredient is 6,000,000 to 10,000,000.

5. The surface treatment composition according to claim 1, wherein:
    a solubility of the first ingredient in water at 25° C. is at least 40 g/100 ml; and/or a solubility of the second ingredient in water at 25° C. is at least 40 g/100 ml.

6. The surface treatment composition according to claim 1, wherein the first ingredient comprises a substance represented by following general formula:

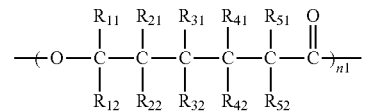

in the general formula:
    one or more of $R_{11}$, $R_{12}$, $R_{21}$, $R_{22}$, $R_{31}$, $R_{32}$, $R_{41}$, $R_{42}$, $R_{51}$, or $R_{52}$ are the acidic group and/or the salt of the acidic group, and remaining groups are selected from hydrogen, $C_1$ to $C_6$ alkyl, $C_1$ to $C_6$ haloalkyl, and halogen; and
    $n_1$ is an integer greater than or equal to 1.

7. The surface treatment composition according to claim 6, wherein one or more of $R_{11}$, $R_{12}$, $R_{21}$, $R_{22}$, $R_{31}$, $R_{32}$, $R_{41}$, $R_{42}$, $R_{51}$, or $R_{52}$ are selected from a carboxylic acid group, a sulfonic acid group, a phosphoric acid group, a carboxylate group, a sulfonate group, or a phosphonate group.

8. The surface treatment composition according to claim 6, wherein, at least one of $R_{11}$, $R_{12}$, $R_{21}$, $R_{22}$, $R_{31}$, $R_{32}$, $R_{41}$, $R_{42}$, $R_{51}$, or $R_{52}$ is —OH, and at least one of $R_{11}$, $R_{12}$, $R_{21}$, $R_{22}$, $R_{31}$, $R_{32}$, $R_{41}$, $R_{42}$, $R_{51}$, or $R_{52}$ is —COOH.

9. The surface treatment composition according to claim 6, wherein one of $R_{11}$, $R_{12}$, $R_{21}$, $R_{22}$, $R_{31}$, $R_{32}$, $R_{41}$, $R_{42}$, $R_{51}$, or $R_{52}$ is —OH, and one of $R_{11}$, $R_{12}$, $R_{21}$, $R_{22}$, $R_{31}$, $R_{32}$, $R_{41}$, $R_{42}$, $R_{51}$, or $R_{52}$ is —COOH.

10. The surface treatment composition according to claim 6, wherein one of $R_{11}$, $R_{12}$, $R_{21}$, $R_{22}$, $R_{31}$, $R_{32}$, $R_{41}$, $R_{42}$, $R_{51}$, or $R_{52}$ is —OH, one of $R_{11}$, $R_{12}$, $R_{21}$, $R_{22}$, $R_{31}$, $R_{32}$, $R_{41}$, $R_{42}$, $R_{51}$, or $R_{52}$ is —COOH, and the —OH and the —COOH are linked to different carbon atoms.

11. The surface treatment composition according to claim 6, wherein one of $R_{41}$ or $R_{42}$ is —OH, and one of $R_{21}$ or $R_{22}$ is —COOH.

12. The surface treatment composition according to claim 1, wherein the second ingredient comprises a substance represented by following general formula:

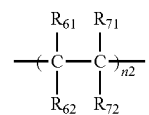

in the general formula:
    one or more of $R_{61}$ and $R_{62}$ are polyether groups;
    $R_{71}$ is selected from a hydrogen atom, $C_1$ to $C_{10}$ alkyl, $C_1$ to $C_{10}$ haloalkyl, and halogen;
    $R_{72}$ is selected from carboxyl, a carboxylate group, $C_1$ to $C_3$ alkyl carboxyl, a $C_1$ to $C_3$ alkyl carboxylate group, an ester group, and a $C_1$ to $C_3$ alkyl ester group; and
    $n_2$ is an integer greater than or equal to 1.

13. The surface treatment composition according to claim 12, wherein the polyether group is selected from a polyethylene glycol diglycidyl ether group, a polyether polyol group, and a combination thereof.

14. The surface treatment composition according to claim 12, wherein:
- $R_{61}$ is a hydrogen atom, and $R_{62}$ is a polyether polyol group; and/or
- $R_{71}$ is a hydrogen atom, and $R_{72}$ is selected from a hydrogen atom, $C_1$ to $C_{10}$ alkyl, $C_1$ to $C_{10}$ haloalkyl, and halogen.

15. An electrode, comprising:
- a current collector;
- an active material layer, wherein the active material layer covers at least a part of a surface of the current collector; and
- an intermediate layer, wherein the intermediate layer is located between the current collector and the active material layer;
- wherein the intermediate layer comprises the surface treatment composition according to claim 1.

16. The electrode according to claim 15, wherein:
- the electrode is a negative electrode; and/or
- a material of the current collector comprises copper or a copper alloy.

17. A secondary battery, comprising the electrode according to claim 15.

18. A device, comprising the secondary battery according to claim 17, wherein the secondary battery is configured to provide electrical energy to the device.

\* \* \* \* \*